United States Patent
Toyooka et al.

(10) Patent No.: US 8,077,223 B2
(45) Date of Patent: Dec. 13, 2011

(54) IMAGE RECORDING METHOD, IMAGE RECORDING APPARATUS, IMAGE RECORDING MEDIUM, IMAGE DISPLAY METHOD, AND IMAGE DISPLAY APPARATUS FOR READING AND RECORDING ACTUAL BRIGHTNESS

(75) Inventors: Takashi Toyooka, Suwa (JP); Shohei Yoshida, Shimo-Suwa-machi (JP); Hidehito Iisaka, Shiojiri (JP); Hidehiro Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1586 days.

(21) Appl. No.: 11/145,946

(22) Filed: Jun. 7, 2005

(65) Prior Publication Data

US 2006/0007214 A1    Jan. 12, 2006

(30) Foreign Application Priority Data

Jun. 14, 2004 (JP) .................. 2004-175535

(51) Int. Cl.
*H04N 5/76* (2006.01)
*H04N 3/12* (2006.01)
*H04N 5/66* (2006.01)
*H04N 9/12* (2006.01)

(52) U.S. Cl. .................. 348/231.6; 348/795

(58) Field of Classification Search .............. 348/231.6, 348/231.3, 795, 333.12
See application file for complete search history.

(56) References Cited

U.S. PATENT DOCUMENTS

| | | | |
|---|---|---|---|
| 5,548,327 A | | 8/1996 | Gunday |
| 6,097,352 A | * | 8/2000 | Zavracky et al. .................. 345/7 |
| 6,650,371 B1 | * | 11/2003 | Morrish et al. ............... 348/569 |
| 6,784,936 B1 | * | 8/2004 | Fukushima et al. ..... 348/333.01 |
| 7,626,615 B2 | * | 12/2009 | Ichikawa et al. ........... 348/223.1 |
| 7,639,220 B2 | * | 12/2009 | Yoshida et al. ................. 345/87 |
| 2003/0053095 A1 | * | 3/2003 | Nakami ......................... 358/1.9 |
| 2003/0086265 A1 | * | 5/2003 | Ilsaka et al. ................... 362/268 |
| 2003/0108337 A1 | * | 6/2003 | Tsuchida et al. ................ 386/95 |
| 2003/0210898 A1 | | 11/2003 | Juen et al. |

(Continued)

FOREIGN PATENT DOCUMENTS

EP    1 321 923 A1    6/2003

(Continued)

OTHER PUBLICATIONS

H. Iisaka et al.; "Novel Projection System Based on an Adaptive Dynamic Range Control Concept"; Corporate R&D, Seiko Epson Corp., Nagano, Japan; LDW'03, pp. 1553-1556; 2003.

(Continued)

*Primary Examiner* — John Villecco
(74) *Attorney, Agent, or Firm* — Oliff & Berridge, PLC

(57) ABSTRACT

An image recording method for an image recording medium is used in an image display apparatus that changes an image on a light valve and changes quantity of light which is incident on the light valve via a light control element according to an input image signal. The image recording method includes accommodating a range of brightness information which an object to be imaged indicates, in an entire range of brightness information which an image recording apparatus can record in the image recording medium; and recording a light-control control signal for controlling the light control element when an image signal is recorded on the image recording medium. The light control element is generated on the basis of the range of the brightness information uniformly expanded, in synchronization with the image signal.

12 Claims, 5 Drawing Sheets

U.S. PATENT DOCUMENTS

| | | |
|---|---|---|
| 2004/0017549 A1 | 1/2004 | Goto et al. |
| 2005/0093995 A1* | 5/2005 | Yoshida .................... 348/223.1 |
| 2007/0222740 A1* | 9/2007 | Hanada ........................ 345/102 |

FOREIGN PATENT DOCUMENTS

| | | |
|---|---|---|
| JP | 03-261284 | 11/1991 |
| JP | A 05-066501 | 3/1993 |
| JP | A 06-070275 | 3/1994 |
| JP | A-11-352568 | 12/1999 |
| JP | 2000050131 A * | 2/2000 |
| JP | A-2000-115672 | 4/2000 |
| JP | A-2001-27890 | 1/2001 |

OTHER PUBLICATIONS

T. Toyooka et al.; "12.3: Illumination Control System for Adaptive Dynamic Range Control"; Corporate R&D, Seiko Epson Corp., Nagano, Japan; SID 04 Digest; pp. 174-177; 2004.

* cited by examiner ically expected, which can electrically con-
IMAGE RECORDING METHOD, IMAGE RECORDING APPARATUS, IMAGE RECORDING MEDIUM, IMAGE DISPLAY METHOD, AND IMAGE DISPLAY APPARATUS FOR READING AND RECORDING ACTUAL BRIGHTNESS This application claims the benefit of Japanese Patent Application No. 2004-175535 filed Jun. 14, 2004. The entire disclosure of the prior application is hereby incorporated by reference herein in its entirety.

BACKGROUND

The exemplary embodiments relate to an image recording method, an image recording apparatus, an image recording medium, an image display method, and an image display apparatus. Particularly, the exemplary embodiments relate to an image recording method, an image recording apparatus, an image recording medium, an image display method, and an image display apparatus, in which the actual brightness when imaging is faithfully recorded, and the actual brightness when imaging can be faithfully expressed from the recording medium in which the actual brightness has been recorded.

In the related art, development of information devices has been remarkably achieved, and needs for a display apparatus that is high in resolution, power-saving, and of a thin type is increasing, so that research and development of such a display apparatus have been conducted. As a display apparatus capable of meeting the above needs, a liquid crystal display apparatus is particularly expected, which can electrically control arrangement of liquid crystal molecule thereby to change optical characteristics. As a form of such a liquid crystal apparatus, a projection-type image display apparatus (liquid crystal projector) has been known, in which, using a light valve (liquid crystal light valve), and a light control element that changes quantity of light that is incident on the light valve, the liquid crystal apparatus enlarges and projects an image emerging from an optical system on a screen through a projection lens. In the related art, technology of adjusting luminance of a light source in the projection-type image display apparatus which enlarges and projects an image on the screen has been disclosed.

In this related art, when an image is recorded in an image recording apparatus, for example, shutter speed or diaphragm is controlled, whereby the focus is placed in a range of brightness that a user hopes, an image is recorded with its brightness, and the image is displayed in an image display apparatus in accordance with the recorded image. However, in such a method, all of brightness information, when actually imaging, is not recorded in the image recording apparatus. Therefore, the brightness faithful to the brightness when actually imaging cannot be expressed.

SUMMARY

An advantage of the exemplary embodiments is to provide, in a projection type image recording apparatus using a light valve and a light control element, an image recording method, an image recording apparatus, an image recording medium, an image display method, and an image display apparatus, in which the actual brightness when imaging can be faithfully recorded, and the actual brightness when imaging can be faithfully expressed from the recording medium in which the actual brightness has been recorded.

In order to achieve the above-described advantage, an image recording method for an image recording medium, according to a first aspect of the exemplary embodiments, is used in an image display apparatus that changes an image on a light valve and changes a quantity of light which is incident on the light valve according to an input image signal. The image recording method includes accommodating a range of brightness information, which an object to be imaged indicates in an entire range of brightness information that an image recording apparatus can record in the image recording medium and recording a light-control control signal to control the light control element when an image signal is recorded in the image recording medium, the light-control control signal being generated on the basis of the range of the brightness information uniformly expanded in synchronization with the image signal.

Hereby, the range of the brightness information that the object to be imaged indicates is adjusted so as to be accommodated uniformly in the entire range of the brightness information that the image recording apparatus can record in the image recording medium, so that the actual brightness when imaging can be faithfully recorded.

Further, an image recording apparatus for recording an image signal on an image recording medium, according to a second aspect of the exemplary embodiments, is used in an image display apparatus that changes an image on a light valve and changes a quantity of light which is incident on the light valve via a light control element according to an input image signal. This image recording apparatus includes a brightness information adjusting unit which uniformly accommodates a range of brightness information which an object to be imaged indicates in the entire range of brightness information which an image recording apparatus can record in the image recording medium; and a synchronization processing unit which records a light-control control signal for controlling the light control element when an image signal is recorded in the image recording medium, which is generated on the basis of the range of the brightness information uniformly expanded in synchronization with the image signal.

Hereby, the range of the brightness information that the object to be imaged indicates is adjusted so as to be accommodated uniformly in the entire range of the brightness information that the image recording apparatus can record in the image recording medium, so that the actual brightness when imaging can be faithfully recorded.

Further, according to a third aspect of the exemplary embodiments, a recording medium of an image recording apparatus that records an image signal in an image recording medium used in an image display apparatus that changes an image on a light valve and changes a quantity of light which is incident on the light valve via a light control element according to an input image signal, records a program to be executed by a computer. The program includes brightness information adjusting processing of accommodating a range of brightness information which an object to be imaged indicates in the entire range of brightness information which the image recording apparatus can record in the image recording medium, and synchronization processing of recording a light-control control signal to control the light control element when an image signal is recorded in the image recording medium, which is generated on the basis of the range of the brightness information uniformly expanded in synchronization with the image signal.

Hereby, the range of the brightness information that the object to be imaged indicates is adjusted so as to be accommodated uniformly in the entire range of the brightness information that the image recording apparatus can record in the image recording medium, so that the actual brightness when imaging can be faithfully recorded.

Further, an image display method according to a fourth aspect of the exemplary embodiments, in an image display apparatus which changes an image on a light valve and changes a quantity of light which is incident on the light valve via a light control element according to an input image signal, includes: reading an image signal and a light-control control signal to control the light control element from an image recording medium; and fully utilizing a dynamic range of the light valve when the image signal is reproduced, and controlling the quantity of light of the light control element on the basis of the light-control control signal in synchronization with an image signal to be reproduced.

Hereby, by only controlling the quantity of light of the light control element, the display image can be faithfully expressed with the actual brightness when imaging.

Further, in the image display method, it is preferable that the light-control control signal is adjusted to a display-characteristic of the image display apparatus thereby to control the quantity of light of the light control element.

Hereby, since the light-control control signal is adjusted to the display-characteristic of the image display apparatus, a reproduction effect of brightness taking a difference in display-characteristic of the image display apparatus into consideration can be more expected.

Further, an image display apparatus according to a fifth aspect of the exemplary embodiments, changes an image on a light valve according to an input image signal, and changes a quantity of light which is incident on the light valve via a light control element. This image display apparatus includes: a unit that reads an image signal and a light-control control signal to control the light control element from an image recording medium; a unit that fully utilizes a dynamic range of the light valve when the image signal is reproduced; and a unit that controls a quantity of light of the light control element on the basis of the light-control control signal in synchronization with an image signal to be reproduced.

Hereby, by only controlling the quantity of light of the light control element, the display image can be faithfully expressed with the actual brightness when imaging.

Further, in the unit that controls the quantity of light of the light control element, it is preferable that the light-control control signal is adjusted to a display-characteristic of the image display apparatus, thereby to control the quantity of light of the light control element.

Hereby, since the light-control control signal is adjusted to the display-characteristic of the image display apparatus, reproduction effect of brightness taking difference in display-characteristic of the image display apparatus into consideration can be more expected.

BRIEF DESCRIPTION OF THE DRAWINGS

The exemplary embodiments will be described with reference to the accompanying drawings, wherein like numbers reference like elements, and wherein.

DETAILED DESCRIPTION OF EMBODIMENTS

Image Recording Apparatus

Firstly, an image recording apparatus according to the exemplary embodiments will be described.

Figure 1:
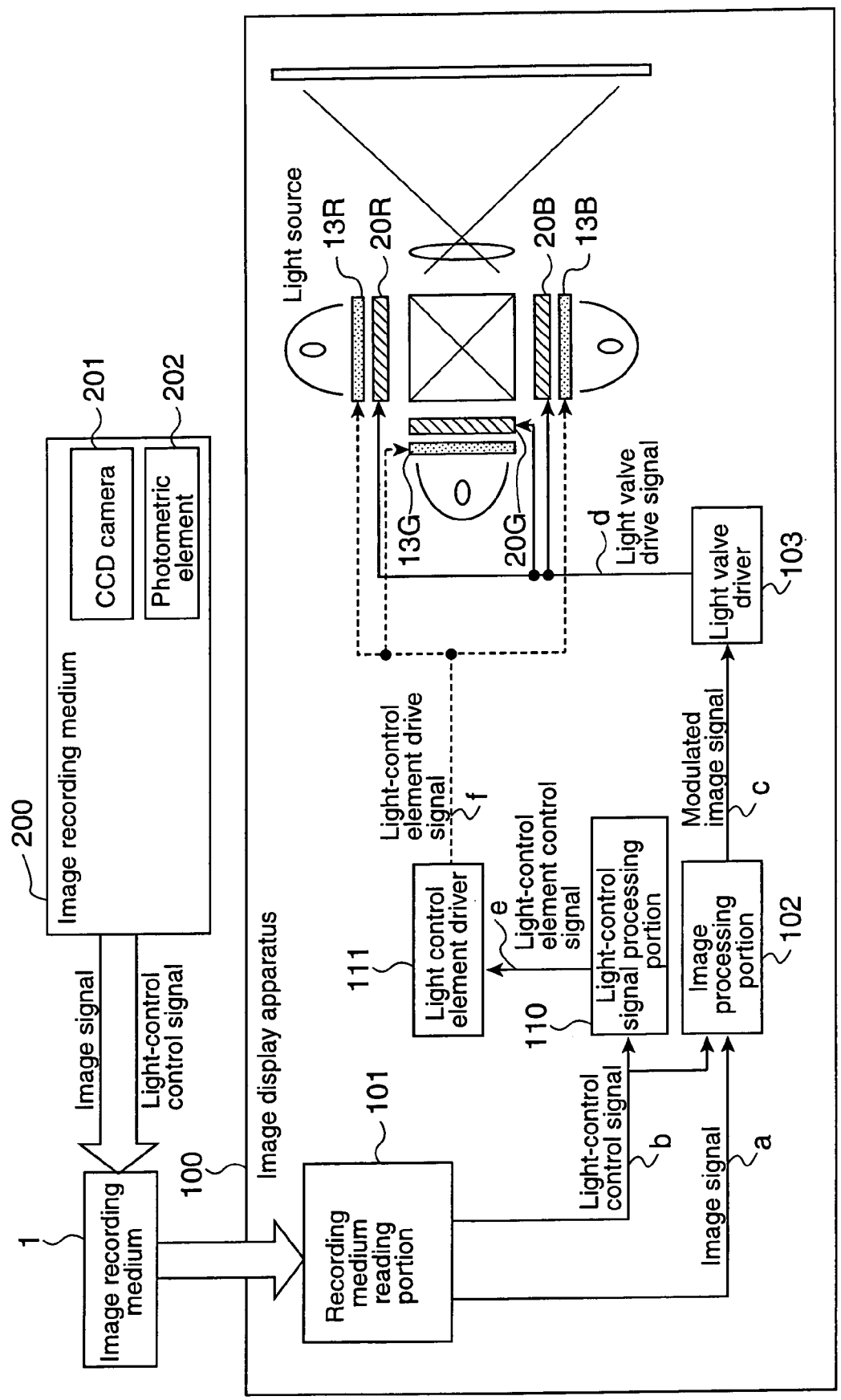
FIG. 1 is a schematic to explain an image recording apparatus.

FIG. 1 is a diagram that explains an image recording apparatus according to the exemplary embodiments. In an image recording apparatus 200, when an image is picked up by a CCD camera portion 201, brightness (exposure) of an image pickup location is measured by a photometric element 202. An "image signal" obtained by the CCD camera portion 201, and a "light-control control signal" generated on the basis of the data measured by the photometric element 202 are recorded in an image recording medium 1. Further, the light-control control signal is recorded in synchronization with a frame (image frame) in the image signal. Further, at this time, brightness information, that an object to be imaged indicates, is adjusted to such information that a range of its information is uniformly accommodated in an entire range of brightness information, which the image recording apparatus 200 can record in the image recording medium 1.

Thus, by previously recording the image signal and the light-control control signal in the image recording medium 1, in a corresponding relation, when the image is reproduced in an image display apparatus 100, non-synchronization between the image and quantity of the light control can be prevented. Accordingly, it is possible to prevent "white collapsing" and "flicker" from being produced in the reproduced image. Further, by adjusting the range of brightness information that the object to be imaged indicates, so as to be accommodated uniformly in the entire range of the brightness information, which the image recording apparatus 200 can record in the image recording medium 1, the actual brightness when imaging can be faithfully recorded. Further, when displaying, from the recording medium in which the actual brightness information has been recorded, the actual brightness when imaging can be faithfully expressed. Further, by the light-control control signal, an image can be reproduced with quantity of light according to the desire of an image creator.

Figure 2:
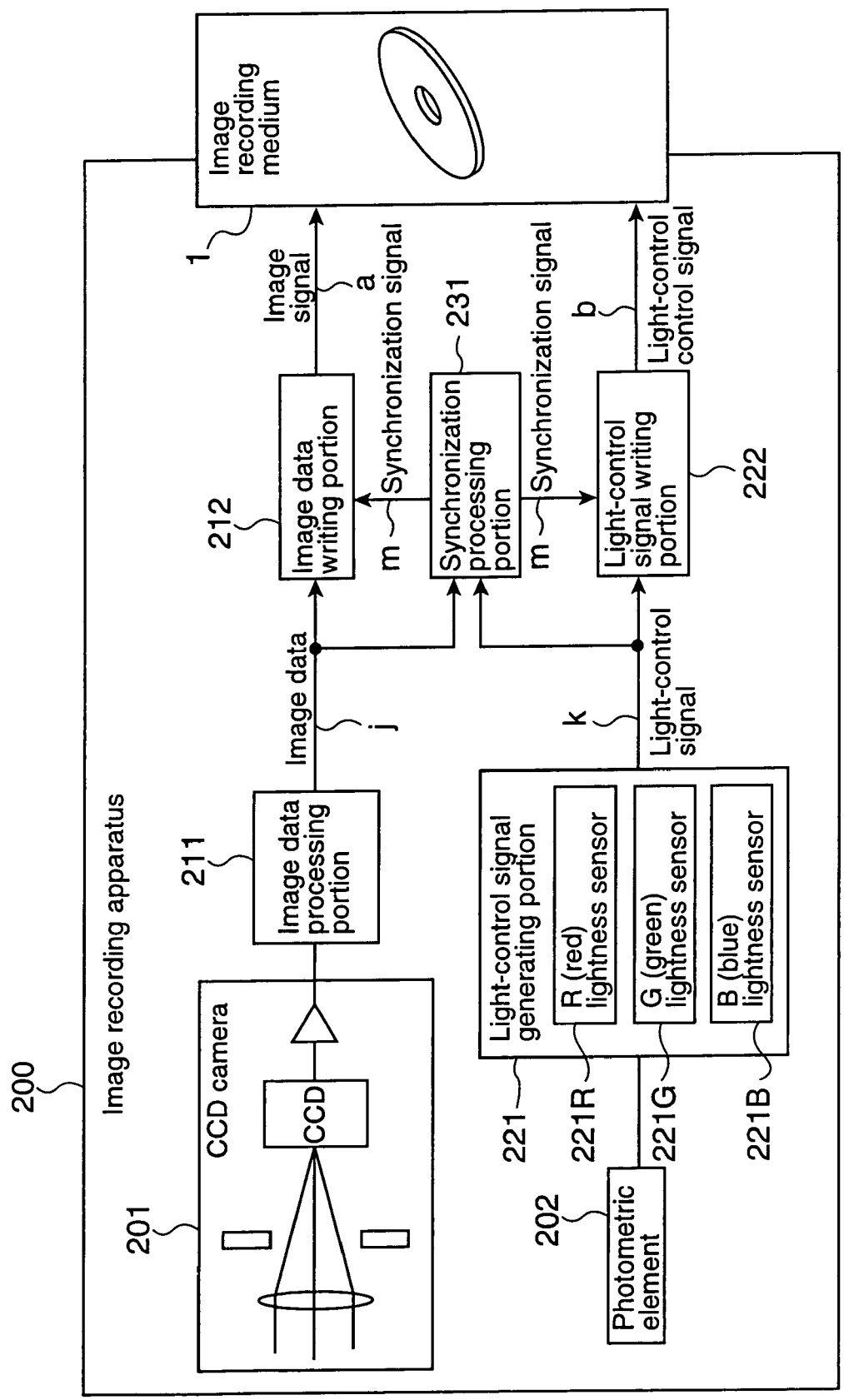
FIG. 2 is a schematic showing a first structure example of the image recording apparatus.

Further, FIG. 2 is a diagram showing a first constitutional example of the image recording apparatus according to the exemplary embodiments, in which reference numeral 201 represents a CCD camera portion, 202 represents a photometric element, 211 represents an image data processing portion, 212 represents an image data writing portion, 221 represents a light-control signal generating portion, 222 represents a light-control signal writing portion, and 231 represents a synchronization processing portion.

The CCD camera portion 201 is a video camera for color image pickup including an optical system and a CCD image imaging element. Imaging data picked up by the CCD camera portion 201 is output to the image data processing portion 211. The image data processing portion 211 digitizes the camera data received from the CCD camera portion 201, and performs compression processing of image data thereby to create image data.

The image data writing portion 212 receives image data j created by the image data processing portion 211, generates from the image data j an image signal a in the predetermined recording format (for example, MPEG or the like), and writes the data into the image recording medium 1.

On the other hand, the photometric element 202 has a function of monitoring brightness (exposure) around an image pickup location where an image is to be picked up by the CCD camera portion 201. The data measured by the photometric element 202 is input in the light-control signal generating portion 221, and the brightness of respective colors of R (Red), G (Green) and B (Blue) are detected by a R (red) lightness sensor 221R, a G (green) lightness sensor 221G and a B (blue) lightness sensor 221B. Further, a light-control signal k for each color is generated in order to control light control elements (refer to light control elements 13R, 13G, and 13B shown in FIG. 1) in the image display apparatus. At this time, the light-control signal generating portion 221 adjusts the detected brightness information of each color of R, G, and B so that it is accommodated uniformly in the entire range of brightness information which the image recording apparatus can record in the image recording medium. The light-control signal generating portion 221 generates the light-control signal k including its brightness information. For example, if shutter speed is slow, the light-control signal generating portion 221 judges the image to be a comparatively dark image. If diaphragm stop is high, the light-control signal generating portion 221 judges the image to be a comparatively light image. Then, the light-control signal generating portion 221 adjusts the brightness information of each color of R, G, and B so that it is uniformly accommodated in the entire range of the brightness information which the image recording apparatus can record in the image recording medium.

Next, the light-control signal k generated by this light-control signal generating portion 221 is output to the light-control signal writing portion 222. The light-control signal writing portion 222 generates a light-control control signal b on the basis of the light-control signal k input from the light-control signal generating portion 221. The light-control signal writing portion 272 writes the light-control signal b into the image recording medium 1. Further, white balance information is also included in this light-control control signal b.

FIG. 3 is a diagram to explain adjustment of brightness information.

Figure 3A:
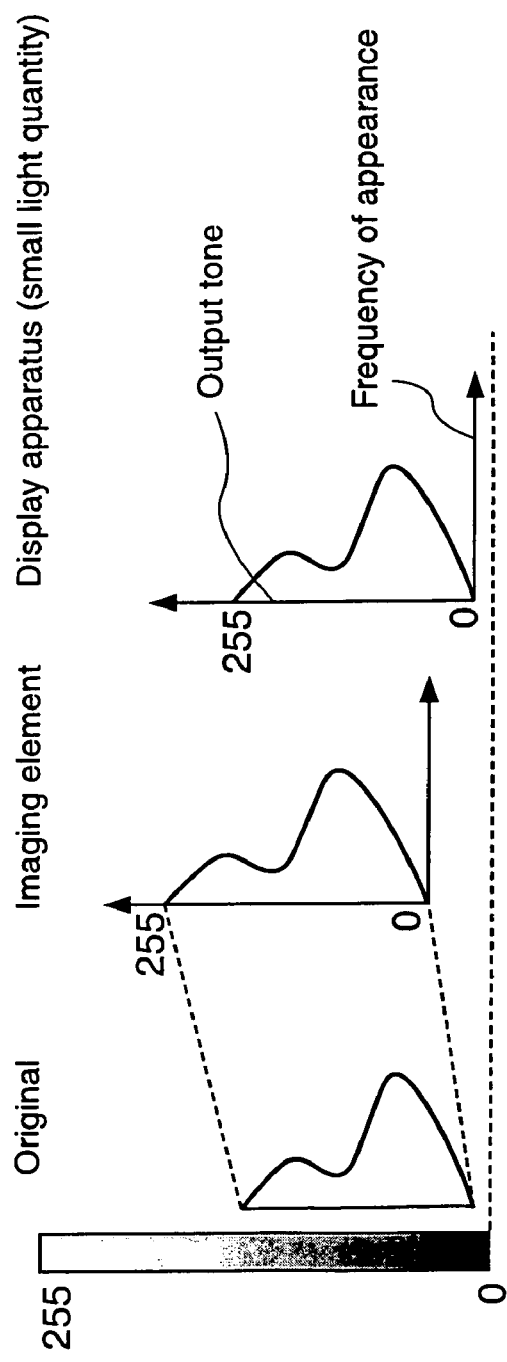
FIG. 3 is a schematic to explain adjustment of brightness information.

As shown in FIG. 3A, if brightness of an object to be picked up indicates a little dark brightness information of about 0 to 128 in a brightness information range of 0 to 255, then the brightness information is adjusted so as to be uniformly accommodated in the entire (0 to 255) range (gradation or latitude) of brightness information, which the image recording apparatus can record in the image recording medium. Further, when the image display apparatus displays the image by use of the image recording medium in which the brightness information has been recorded as shown in FIG. 3A, quantity of light is decreased by the light control element of the image display apparatus.

Figure 3B:
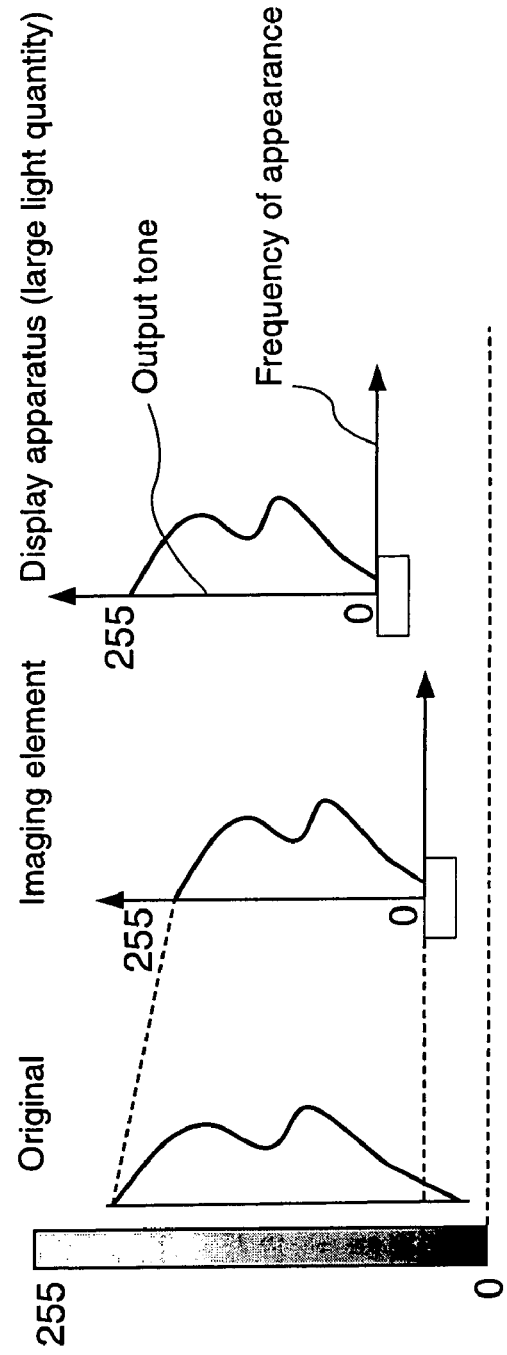

Further, as shown in FIG. 3B, also in case that brightness of an object to be imaged indicates a little light brightness information, the brightness information is adjusted so as to be uniformly accommodated in the entire (0 to 255) range (gradation or latitude) of the brightness information, which the image recording apparatus can record in the image recording medium. Further, when the image display apparatus displays the image by use of the image recording medium in which the brightness information has been recorded, as shown in FIG. 3B, quantity of light is increased by the light control element of the image display apparatus.

Further, the synchronization processing portion 231, on the basis of the image data j and the light-control signal k, generates a synchronization signal m. This synchronization signal m is sent to the image data writing portion 212 and the light-control signal writing portion 222. Writing of the light-control control signal b into the image recording medium 1 is performed with establishing synchronization with the image signal a.

Further, writing of the light-control control signal b into the image recording medium 1 is performed for each color of R (red), G (green), and B (blue), or a light-control control signal b common to each color may be written according to necessity.

Further, regarding contents of the light-control control signal recorded in the image recording medium 1, various information can be used, for example, information of light-control quantity (light-attenuation quantity), brightness information of screen, and information of exposure in image pickup time. Namely, as long as the light-control control signal b, is information which can appropriately control, the light-control quantity of the light control elements 13R, 13G, and 13B according to the image on the image display apparatus 100 side, any information may be used.

Further, in the image recording apparatus 200, without using the photometric element 202, the light-control signal may be obtained directly from the image data. For example, the light-control signal generating portion 221 in the image recording apparatus 200 acquires the image information j from the image data processing portion 211, and generates the light-control signal k from gradation (for example, a maximum value, an average value, or the like) of brightness in this image data. At this time, the light-control signal generating portion 221 adjusts the brightness data of each color of R, G, and B so that it is uniformly accommodated in the entire range of brightness information which the image recording apparatus can record in the image recording medium, and generates the light-control signal k including its brightness information. Further, the light-control writing portion 222 generates the light-control control signal b on the basis of the light-control signal k, and writes the signal b into the image recording medium 1.

In this example, the photometric element 202 can be omitted, and the light-control control signal b can be generated on the basis of the image data j thereby to record the signal b in the image recording medium 1.

[Image Display Apparatus]

Next, an image display apparatus according to the invention will be described.

Figure 4:
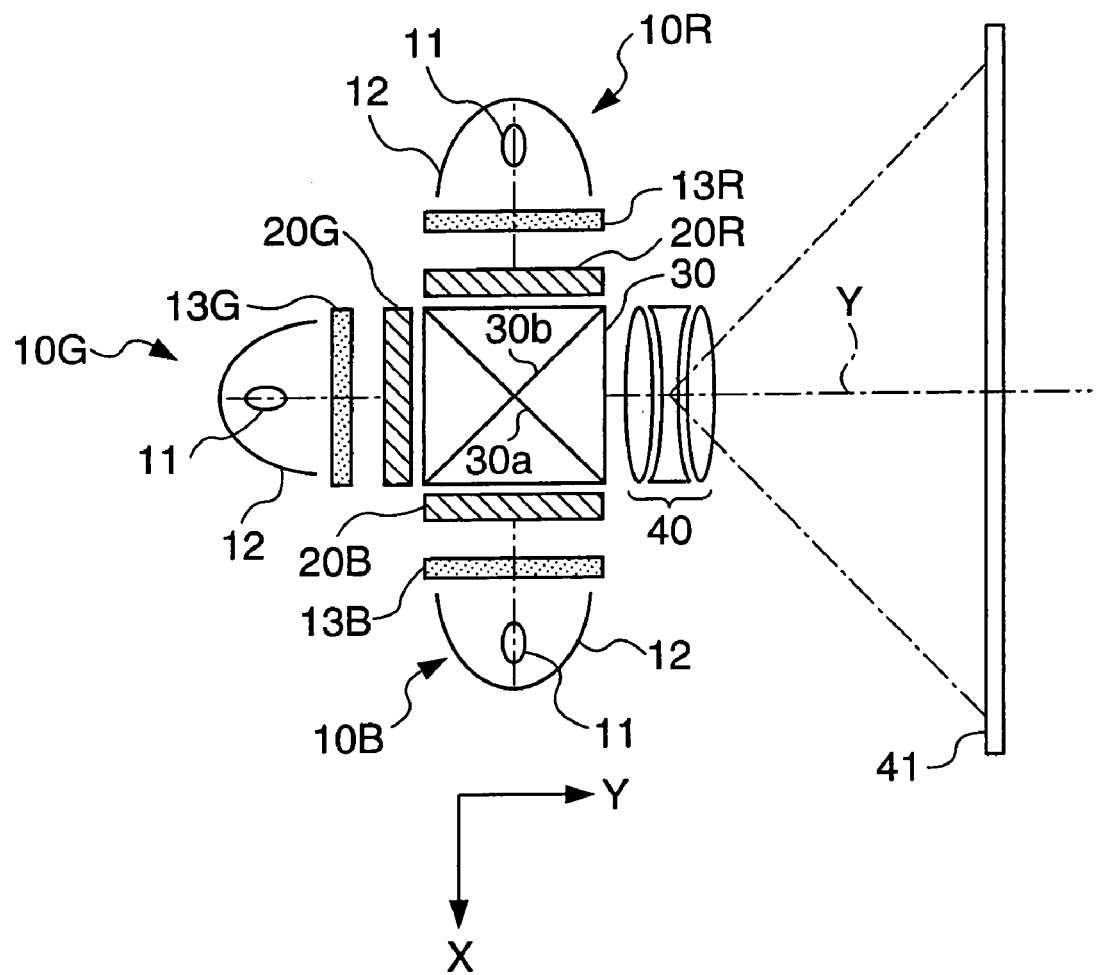
FIG. 4 is a schematic block diagram of a display portion of a projection type image display apparatus.

FIG. 4 is a schematic block diagram of a display portion of a projection type image display apparatus to which the exemplary embodiments are applied. FIG. 4 illustrates an example of projection type color image display apparatuses of a three-plate type having a transmission type light valve (liquid crystal light valve or the like) for each of different colors of R (red), G (green), and B (blue). In the figures, reference numerals 10R, 10G, and 10B represent a light source; 13R, 13G, and 13B represent a light control element; 20R, 20G, and 20B represent a light valve (liquid crystal valve or the like); 30 represents a cross-dichroic prism; 40 represents a projection lens; and 41 represents a screen.

The light sources 10R, 10G, and 10B are color light sources which can respectively emit red light, green light, and blue color. Each light source 10R, 10G, 10B includes a light emitter 11 such as a light emitting diode (LED) organo-electroluminescence element (organic EL element) or an inorgano-electroluminescence element (inorganic EL element), and a reflector 12 which reflects output light of the light emitter 11. Further, light valves 20R, 20G, and 20B are provided correspondingly to the respective light sources 10R, 10G, and 10B, and light modulation can performed for each light source.

Further, the light control element 13R, 13G, 13B is schematically composed of a liquid crystal panel comprising a pair of glass substrates (light transmission substrates) between which a liquid crystal layer is held, and polarizing plates laminated on both sides of this liquid crystal panel. As the liquid held between a pair of the glass substrates, a type which is large in response time, such as FLC is used.

In the light control element 13R, 13G, 13B, when a voltage is applied onto a light transmission electrode upon reception of a drive signal from a light control element driver, if time distribution to non-application of voltage and application of voltage for a frame is changed, time distribution to transmissivity 100% and transmissivity 0% can be changed freely. Further, by thus changing the time distribution to transmissivity 100% and transmissivity 0%, the quantity of light emitted per a frame from the light control element 13R, 13G, 13B can be changed. Therefore, in case of a light screen, the time distribution to transmissivity 100% in one frame is made large or increase and the time distribution to transmissivity 0% is made small or reduced thereby to make the quantity of light for one frame large.

Further, in case of a dark screen, the time distribution to transmissivity 100% in one frame is made small or reduced and the time distribution to transmissivity 0% is made large or increased thereby to reduce the quantity of light, so that the quantity of the light emission for one frame from the light emitter 11 (quantity of the light for one frame emitted from the light emitter 11) is adjusted by this light control element 13R, 13G, 13B.

Further, the cross-dichroic prism 30 has the structure in which four right prisms are pasted to each other. On pasted surfaces 30a and 30b of the four prisms, light reflection films (omitted in the figure) composed of multilayer dielectric films are cross-shaped. Specifically, on the pasted surface 30a, the light reflection film is provided, which reflects a red image light formed by the light valve 20R, and transmits a green image light formed by the light valve 20G and a blue image light formed by the light valve 20B. On the other hand, on the pasted surface 30b, the light reflection film is provided, which reflects the blue image light formed by the light valve 20B, and transmits the red image light formed by the light valve 20R and the green image light formed by the light valve 20G. By these light reflection films, the image lights of the respective colors formed by the respective light valves 20R to 20B are synthesized, whereby light representing a color image is formed. The synthesized light is projected on the screen 41 by the projection lens 40 that is a projection optical system, and the enlarged image is displayed.

Next, an example of circuit structure of the image display apparatus according to the exemplary embodiments will be described.

Figure 5:
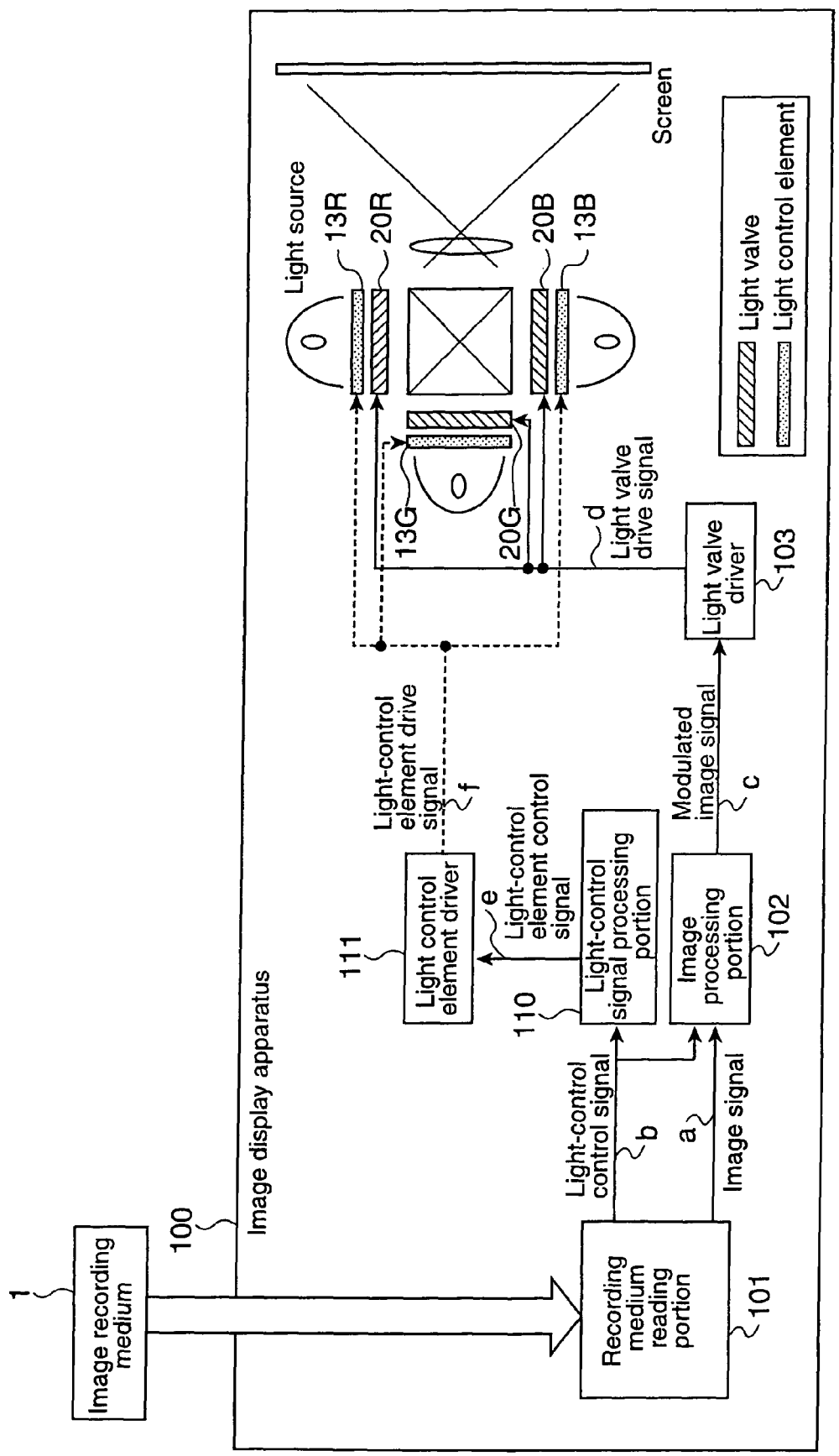
FIG. 5 is a schematic showing a structure example of the image display apparatus.

FIG. 5 is a diagram showing a first structure example of the image display apparatus according to the exemplary embodiments, in which reference numeral 1 is an image recording medium (a CD-ROM, a DVD-ROM, or the like) in which an image signal and a light-control control signal have been recorded, 100 is an image display apparatus, 101 is a recording medium reading portion to read the "image signal" and the "light-control control signal" which have been recorded in the image recording medium, 102 is an image processing portion which performs expand processing of an image signal, 103 is a light valve driver which drives a light valve, 110 is a light-control signal processing portion which generates a signal to drive a light control element driver on the basis of the light-control control signal and white balance information included in the light-control control signal, and 111 is a light-control element driver. Further, the light valve driver 103 and the light-control element driver 111 have a function of performing the drive for each of different colors of R (red), G (green), and B (blue).

The image recording medium 1 such as a DVD-ROM or a CD-ROM is inserted into the recording medium reading portion 101, and the recording medium reading 101 reads the "image signal" and the "light-control control signal (synchronized with a frame of the image signal)" which have been recorded in the image recording medium 1. Further, although this light-control control signal usually records control information on light control quantity for each of the different colors of R (red), G (green), and B (blue), it can also record control information on light control quantity common to the colors of R (red), G (green), and B (blue).

The image signal a and the light-control control signal b which have been read by the recording medium reading portion 101 are output to the image processing portion 102. Further, the light-control control signal b is output also to the light-control signal processing portion 110. The image processing portion 102 provides, for the image signal a, input from the recording medium reading portion 101, the image processing such as expansion processing of setting expansion quantity of an image signal of each color, and outputs a modulated image signal c to the light valve driver 103. Further, at this time, information indicating brightness obtained from the light-control signal b is also output to the light valve driver 103. The light valve driver 103 generates a light valve drive signal d on the basis of the "modulated image signal c" and the information indicating the brightness which have been input from the image processing portion 102. The light valve driver 103 drives the light valves 20R, 20G, and 20B. At this time, the light valves 20R, 20G, and 20B are controlled by the light valve driver 103 so as to use a dynamic range of the corresponding light valve fully.

Further, the light-control signal processing portion 110, on the basis of the light-control control signal b input from the recording medium reading portion 101, generates and outputs a light-control element control signal e for driving the light-control element driver 111.

The light-control element driver 111, on the basis of the light-control element control signal e input from the light-control signal processing portion 110, generates a light-control element drive signal f, drives the light control elements 13R, 13G, and 13B, and controls quantity of lights that are incident on the light valves 20R, 20G, and 20B. At this time, if the light-control control signal b includes white balance information, since the light valve performs display in the full range, and if the light-control signal processing portion 110 controls individually the light control elements, the optimum white balance can be reproduced.

Further, in the light-control signal processing portion 110 of the image display apparatus, characteristics of the image display apparatus may be added to the light-control control signal. For example, in case of an image display apparatus which can output an image that is not so large in dynamic range but sufficiently light, the light-control signal processing portion 110 holds display characteristics (brightness information included in the light-control control signal<luminance, illuminance, contrast ratio>coefficient corresponding to luminance, illuminance, contrast ratio) for the light-control control signal, and multiplies the light-control control signal by a coefficient (>1) of the display characteristic. Hereby, since a quantity of light control can be controlled so as to become large, brightness close to brightness of the original object to be imaged can be reproduced. Further, to the contrary, if an image display apparatus which cannot output sufficient brightness, the light-control signal processing portion 110 multiplies the light-control control signal by a coefficient (<1) according to display-characteristics for the light-control control signal. Hereby, quantity of light control is controlled so as to become small, and brightness close to brightness of the original object to be imaged can be reproduced. Further, if a photometric value of the picked-up image is known, referring to the characteristics of the display apparatus, the light-control control signal can be determined so that the brightness obtained by the photometric value is reproduced, and the light control element can be controlled. For example, a case in which the characteristic of the display apparatus is 1000 lm in full white display, if the photometric value (herein maximum illuminance) of the picked-up image is 500 ml, by controlling the quantity of illumination light so as to become half, an image having the maximum illuminance of 500 ml which is the same as the illuminance when imaging can be reproduced.

As contents of the light-control control signal to be recorded in the image recording medium 1, various information can be used, for example, information of light-control quantity (light-attenuation quantity), brightness information of screen, and information of exposure when imaging (shutter speed, diaphragm, and sensitivity of a imaging element are determined by the environment when imaging).

Namely, the light-control control signal b, as long as it can appropriately control the light-control quantity of the light control elements 13R, 13G, and 13B according to the image, may be any information.

Thus, in the image display apparatus of the exemplary embodiments, when the image signal recorded in the image recording medium is reproduced, the light-control control signal previously recorded corresponding to the image signal is read out simultaneously with the image signal, and the light-control quantity is appropriately controlled in synchronization with the image to be reproduced by this light-control control signal. Hereby, when the image signal is reproduced by the image display apparatus, non-synchronization between the reproduced image and the light-control quantity can be prevented, and it is possible to prevent "white collapsing" and "flicker" from being produced in the image.

Further, when the light valve driver 103 controls the light valve, the dynamic range is used fully, and the light-control element driver 111 receives the light-control element control signal from the light-control signal processing portion 110 thereby to control the light control element. Further, at this time, since the light-control control signal is matched with the display characteristics of the image display apparatus, reproduction effect of brightness taking difference in the display characteristic of the image display apparatus into consideration can be expected more.

Although the exemplary embodiments have been described above, each processing portion in the image recording apparatus shown in FIGS. 1 and 2, and each processing portion in the image display apparatus shown in FIGS. 4 and 5 may achieve its function by use of a specialized hardware. Further, by recording a program for realizing the function of each processing portion in a computer-readable recording medium, loading the program recorded in this recording medium into a computer system, and executing the program, processing necessary for each processing portion in the image recording apparatus shown in FIGS. 1 and 2, and each processing portion in the image display apparatus shown in FIGS. 4 and 5 may be performed. Herein, the "computer system" includes OS and hardware such as peripheral equipments.

Further, the "computer-readable recording medium" is a portable medium such as a flexible disc, a photomagnetic disc, a ROM or a CD-ROM, or a memory device such as a hard disc included in the computer system. Further, the "computer-readable recording medium" includes a medium that holds a program dynamically for a short time (transmission medium or transmission wave) like a communication line which transmits a program through a network such as the Internet and a communication line such as a telephone line, and also a medium that holds a program for a fixed time like a volatile memory inside the computer system that functions as a server or a client in that case. Further, the above program may be used in order to realize a part of the functions, and further may be a so-called differential file (differential program) which can realize the before-mentioned functions in combination with the program that has been recorded in the computer system.

Although the exemplary embodiments have been described above, the image display apparatus and the image recording apparatus of the exemplary embodiments are not limited to only the above-shown examples but various changes can be added without departing from the subject matter scopes or spirit of the exemplary embodiments.

What is claimed is:

1. An image display method in an image display apparatus which changes an image on a light valve according to an input image signal, and changes, by a light control element, quantity of light which is incident on the light valve, comprising:
reading the input image signal and a light-control control signal for controlling said light control element from an image recording medium;
creating a modulated image signal based on a combination of the input image signal and the light-control control signal read from the image recording medium;
utilizing a dynamic range of the light valve fully when the input image signal is reproduced based on the modulated image signal; and
controlling a quantity of light of said light control element on the basis of said light-control control signal in synchronization with the input image signal of the modulated image signal,
wherein the light-control control signal relates to an amount of ambient light incident on a camera at the time of taking a picture.

2. The image display method according to claim 1, comprising adjusting said light-control control signal to display-characteristic of the image display apparatus thereby to control quantity of light of said light control element.

3. The image display method according to claim 1, further comprising:
generating a synchronization signal based on the input image signal and the light-control control signal.

4. The image display method of claim 1, further comprising:
generating a synchronization signal based on the input image signal and the light-control control signal, wherein the synchronization signal is sent to an image-data writing portion and a light-control signal writing portion.

5. The image display method according to claim 1, further comprising:
adjusting brightness information of the input image so as to be uniformly accommodated in an entire range of brightness information capable of being displayed by the image display apparatus when the brightness information of the input image satisfies a predetermined condition.

6. The image display method according to claim 5, wherein the predetermined condition is satisfied when the brightness information of the input image is contained within a predetermined subset of the entire range of brightness information capable of being displayed by the image display apparatus, or when the brightness information of the input image extends beyond the range of brightness information capable of being displayed by the image display apparatus.

7. An image display apparatus which changes an image on a light valve according to an input image signal, and changes, by a light control element, quantity of light which is incident on the light valve, comprising:
   a unit that reads the input image signal and a light-control control signal for controlling said light control element from an image recording medium;
   a unit that creates a modulated image signal based on a combination of the input image signal and the light-control control signal read from the image recording medium;
   a unit that utilizes a dynamic range of the light valve fully when said input image signal is reproduced based on the modulated image signal; and
   a unit that controls a quantity of light of said light control element on the basis of said light-control control signal in synchronization with the input image signal from the modulated image signal,
   wherein the light-control control signal relates to an amount of ambient light incident on a camera at the time of taking a picture.

8. The image display apparatus according to claim 7, wherein said light-control control signal is adjusted to display characteristic of its own display apparatus in the unit that controls the quantity of light of said light control element, thereby to control quantity of light of said light control element.

9. The image display apparatus of claim 7, further comprising:
   a synchronization processing portion that generates a synchronization signal based on the input image signal and the light-control control signal.

10. The image display apparatus of claim 7, further comprising:
    a synchronization processing portion that generates a synchronization signal based on the input image signal and the light-control control signal, wherein the synchronization signal is sent to an image-data writing portion and a light-control signal writing portion.

11. The image display apparatus according to claim 7, further comprising:
    a unit that adjusts brightness information of the input image so as to be uniformly accommodated in an entire range of brightness information capable of being displayed by the image display apparatus when the brightness information of the input image satisfies a predetermined condition.

12. The image display method according to claim 11, wherein the predetermined condition is satisfied when the brightness information of the input image is contained within a predetermined subset of the entire range of brightness information capable of being displayed by the image display apparatus, or when the brightness information of the input image extends beyond the range of brightness information capable of being displayed by the image display apparatus.

* * * * *